March 25, 1958 J. K. ELSCHLAGER 2,827,711
CUTTER SETTING DEVICE
Filed Aug. 25, 1955
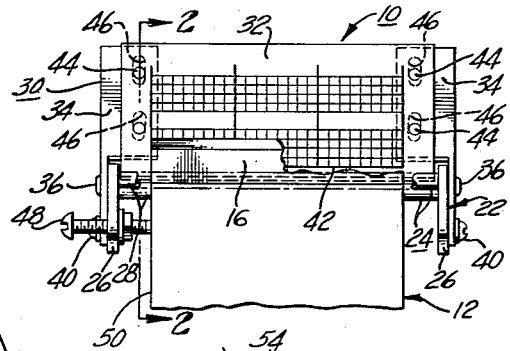
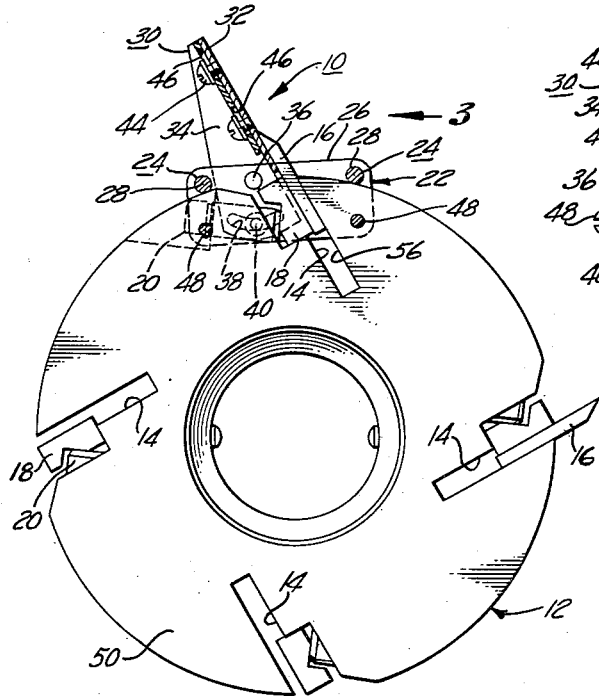
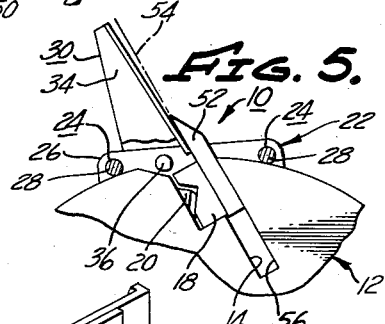
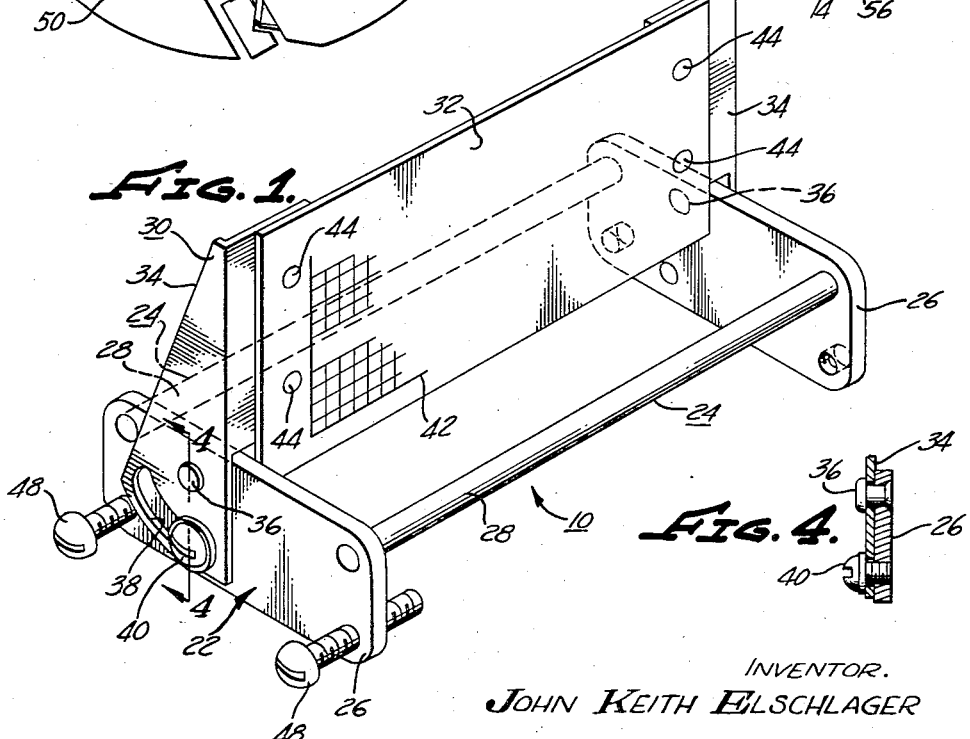
INVENTOR.
JOHN KEITH ELSCHLAGER
BY HIS ATTORNEYS.
HARRIS, KIECH, FOSTER & HARRIS

United States Patent Office 2,827,711
Patented Mar. 25, 1958

2,827,711

CUTTER SETTING DEVICE

John Keith Elschlager, Los Angeles, Calif.

Application August 25, 1955, Serial No. 530,550

16 Claims. (Cl. 33—185)

The present invention relates in general to a device or jig for setting or positioning the blades or knives of a circular cutter head used in woodworking, or the like, a primary object of the invention being to provide an improved device of this nature.

Positioning the knives on a circular cutter head must be done accurately to obtain and maintain the correct finished product. The problem is basically a difficult one, and is complicated by the fact that cutter heads vary in diameter, the knife slot angles vary, the knife thicknesses vary, the base line cuts, or cutting circles, vary in diameter, the knives themselves are of many different types, the gibs and gib screws for holding the knives are of many different types, and the like. It is my experience that there is no device or jig presently available which will quickly and accurately position the blades or knives, particularly with the complicating factors mentioned, and an important object of the present invention is to provide a jig which will overcome these difficulties.

More particularly, general objects of the invention are to provide a blade-positioning jig for use with circular cutter heads which will handle any head diameter, any knife slot angle, any knife thickness, any base line cut, or cutting circle diameter, various types of gibs and gib screws, and any type of knife, whether straight, sectional, patterned, or the like. A related object is to provide a jig which may be utilized not only to position a knife, but which may be used as a template to which to grind, or otherwise form, a blade or knife.

Still more particularly, a primary object of the invention is to provide a device for setting a knife in a knife slot in a circular cutter head which includes a base having two spaced contact means engageable with the periphery of the cutter head on opposite sides of the blade slot, a blade-positioning gauge, and means mounting the gauge on the base between the contact means for engagement by a blade disposed in the blade slot and projecting outwardly therefrom between the contact means. A related object is to provide contact means having cylindrical contact surfaces making line contact with the periphery of the cutter head on opposite sides of the blade slot.

With the foregoing construction, the two contact means provide a very simple way of accurately seating the jig on the cutter head to bring the gauge into operative relation with a blade in the blade slot. The jig may be positioned on the cutter head very quickly, there being no necessity for bolting it or otherwise securing it to the head. Also, with this construction, the jig may be quickly and accurately positioned on a cutter head of any diameter, the contact means described conforming to any head diameter.

Another object is to provide a jig of the foregoing nature wherein the gauge is a ruled plate or scale by means of which a knife can be set to or away from any desired base line cut, or cutting circle, whether the knife be a straight knife, a sectional knife, a patterned knife, or the like.

Another object is to provide a jig which includes support means for the gauge and which includes means pivotally mounting the support means on the base for pivotal movement about an axis lying generally between the two contact means. With this construction, various blade slot angles and various blade thicknesses may be accommodated, which is an important feature of the invention.

Another object of the invention is to provide means adjustably mounting the gauge plate on the support means for movement generally toward and away from the contact means, i. e., generally toward and away from the periphery of the cutter head. With this adjustment, the base line may be positioned any desired distance from the axis of rotation as required by the particular operating conditions. Also, an object is to provide adjustable mounting means for the gauge which permits cocking of the gauge to render the base line on the gauge non-parallel to the periphery of the cutter head, whereby blades may be set to produce beveled cuts, or the like.

Another object is to provide a jig having means engageable with one end of the cutter head for adjusting the position of the gauge axially of the cutter head to line it up properly.

Another object is to provide a jig wherein the two contact means are relatively closely spaced, the spacing thereof being small as compared to the circumference of any cutter head with which it may be used, whereby access is provided to gib screws lying outside the space between the contact means. Also, in certain types of cutter heads, access to the gib screws may be provided through the space between the contact means.

The foregoing objects, advantages, features and results of the present invention, together with various other objects, advantages, features and results thereof which will be apparent to those skilled in the art in the light of this specification, may be attained with the exemplary embodiment of the invention illustrated in the accompanying drawing and described in detail hereinafter. Referring to the drawing:

Fig. 1 is a perspective view on an enlarged scale illustrating a cutter setting jig of the invention;

Fig. 2 is a view showing my cutter setting jig, in transverse section, seated on a cylindrical cutter head, which is shown in end elevation, Fig. 2 being taken along the arrowed broken line 2—2 of Fig. 3;

Fig. 3 is a front elevation of the jig of the invention, being taken as indicated by the arrow 3 of Fig. 2;

Fig. 4 is a fragmentary sectional view taken along the arrowed line 4—4 of Fig. 1; and Fig. 5 is a fragmentary view similar to Fig. 2, but illustrating the effect of a change in knife thickness on the jig of the invention and how the jig may be adjusted to compensate for such change in knife thickness.

Referring to the drawing, the numeral 10 designates generally a device or jig of the invention for use with a cylindrical cutter head, such as the cutter head 12. This head is provided with the usual slots 14 for knives or blades 16, Figs. 2 and 3, these knives being clamped in place in the slots in the usual manner by means of gibs 18 and gib screws 20. As is well known in the art, the problem in setting the knives 16 is to locate accurately the cutting edges thereof the proper distance from the axis of the cutter head 12. The particular knives 16 shown are straight, single knives, but it will be understood that sectional and/or patterned knives may be substituted.

Considering the jig 10, it includes a base 22 having two spaced, parallel contact means 24 engageable with the periphery of the cutter head 12 on opposite sides of one of the blade slots 14. In the particular construction illustrated, the base 22 includes two end members 26 which are spaced apart axially of the cutter head 12 in use, and the contact means 24 respectively include contact members 28 which interconnect the end members. The contact members 28 are provided with cylindrical contact surfaces making line contact with the periphery of the cutter head 12, the cylindrical contact surfaces preferably being provided by making the contact members cylindrical rods, as shown.

The base 22 carries support means 30 for a gauge 32, the support means including two support members 34 respectively pivotally connected to the end members 26 of the base 22 by aligned pivots 36. These pivots provide a pivot axis for pivotal movement of the gauge 32 relative to the base 22 which lies generally between and is parallel to the contact members 28 to position the gauge between the contact members for blade-positioning engagement by one of the blades 16 disposed in one of the slots 14 and projecting outwardly therefrom between contact members 28. The support members 34 are provided with arcuate slots 38 for clamping screws 40 threaded into the respective end members 26. By means of the clamping screws 40, the gauge 32 may be locked in any desired angular position relative to the base 22. The gauge 32 is a ruled plate or scale, and is provided with a base line 42, as is well known in the art. The gauge 32 is adjustably mounted on the support members 34 for movement inwardly and outwardly toward and away from the periphery of the cutter head 12, by means of clamping screws 44 extending through slots 46 in the support members 34 and threaded into the gauge itself. Preferably, the slots 46 are somewhat wider than the screws 44 so that the gauge 32 can be cocked to make the base line 42 non-parallel to the axis of the cutter head 12 when the contact members 28 are in engagement with the periphery of the cutter head and parallel to the axis thereof. This cocking of the gauge permits cocking straight knives, for example, to make beveled cuts, if desired.

One of the end members 26 of the base 22 is provided with one or more adjusting screws 48 engageable with an end 50 of the cutter head 12 to properly line the scale on the gauge 32 up with the cutter head, the length of the contact members 28 being such that the end members 26 are disposed outwardly from the opposite ends of the cutter head 12 in use.

Considering the operation of the jig 10, it is merely placed on the cutter head 12 with the contact members 28 located on opposite sides of one of the knife slots 14 and with the corresponding knife 16 projecting outwardly between the contact members. It will be noted that with the construction shown, the jig 10 may be slid circumferentially of the cutter head 12 readily until it is in the proper position, no special positioning or securing means being necessary. By providing the contact members 28 with cylindrical contact surfaces, these members make line contact with the periphery of the cutter head so that the jig may be utilized with a cutter head of any diameter, the two contact members always maintaining the same orientation of the base relative to the axis of the cutter head.

The angle of the gauge 32 is then set to correspond to the angle of the slot 14 by pivoting the gauge about the axis of the pivots 36 until the gauge lies flat against the knife 16, whereupon the clamping screws 40 may be locked to maintain this setting. Thus, it will be noted that the jig 10 will accommodate any knife slot angle.

It is also immaterial what the thickness of the knife may be since the device may be shifted circumferentially and the angle of the gauge 32 relative to the base 22 adjusted to accommodate a thicker or thinner knife. For example, Fig. 5 shows a knife 52 which is thicker than the knives 16 of Figs. 2 and 3, the device 10 being shown in Fig. 5 with the same angular setting for the gauge 32 which corresponds to the thickness of the knife 16. As shown in Fig. 5, the gauge 32 is no longer parallel to the knife 52 because the added thickness has necessitated circumferential shifting of the jig 10. However, this can be compensated for readily by loosening the clamping screws 40 and readjusting the angle of the gauge 32 relative to the base 22, until the face of the gauge lies along the line 54. Under such conditions, the gauge 32 is again parallel to the knife slot, or, more accurately, to the wall 56 thereof. Thus, it will be apparent that not only will the jig 10 accommodate different knife slot angles, but it will accommodate different knife thicknesses in the same, or other, slots, which is an important feature.

The gauge 32 may be adjusted relative to the support members 34 to properly locate the base line 42 relative to the axis of the cutter head 12 so as to establish the desired cutting circle. The base line 42 may be maintained parallel to the axis of the cutter head, or, as previously discussed, it may be cocked if it is desired to position the knife 16 for a bevel cut.

The final step is to properly position the knife relative to the gauge 32 so as to secure the desired depth of cut, the gib screws 20 being loosened slightly to permit this, and being retightened after the knife has been properly positioned. The positioning of the knife may take place with reference to the ruled scale on the gauge 32, or with reference to a pattern, not shown, thereon in the case of a patterned knife, the exact nature of the markings on the gauge depending on particular conditions.

It should be pointed out that before positioning the knife 16 in the foregoing manner, the gauge 32 is properly lined up axially of the cutter head 12 by means of the adjusting screws 48. These screws may be threaded inwardly or outwardly to move the jig 10 in one direction or the other relative to the cutter head 12 as required.

The foregoing results in accurate positioning of one of the knives 16, and the remaining knives are then positioned in the same way so that the settings thereof are all identical, assuming that all of the knives are identical. It is not necessary that all of the knives mounted on the cutter head 12 be identical since they may vary in thickness, or some may be sectional or patterned knives while others may be straight knives or the like. In other words, various combinations of knives may be used, each settable by means of the jig 10 in the manner described. The knife settings are quickly and accurately accomplished by means of the jig 10 and a few simple tools for adjusting it and the gib screws 20, and there is no necessity to anchor the jig to the cutter head at any time.

It should be noted that the contact members 28 are relatively closely spaced so that the gib screws 20 are accessible externally of the space occupied by the jigs 10. This construction also permits use of the jig on cutter heads of small diameter. In the event that cutter heads having gib screws of other types are encountered, access thereto may still be had. For example, with some types of gib screws, access thereto may be had through the space between one of the contact members 28 and the gauge 32.

Although I have disclosed an exemplary embodiment of the invention herein for purposes of illustration, it will be understood that various changes, modifications and substitutions may be incorporated in such embodiment without departing from the spirit of the invention as defined by the claims hereinafter appearing.

I claim as my invention:

1. In a device for setting a blade in a blade slot in a circular cutter head, the combination of: a base having two spaced, parallel contact means engageable with the periphery of the cutter head on opposite sides of the blade slot; a blade-positioning gauge having a plane gauge surface; and means mounting said gauge on said base with the plane of said gauge surface between and parallel to said contact means, whereby said gauge surface is engageable by a blade disposed in the blade slot and projecting outwardly therefrom between said contact means to position such blade.

2. A device as defined in claim 1 wherein said contact means have cylindrical contact surfaces each making line contact with the cutter head.

3. In a device for setting a blade in a blade slot in a circular cutter head, the combination of: a base having contact means engageable with the periphery of the cutter head; a blade-positioning gauge; support means for said gauge; means pivotally mounting said support means on said base for pivotal movement about an axis generally parallel to said contact means; and means mounting said gauge on said support means.

4. In a device for setting a blade in a blade slot in a circular cutter head, the combination of: a base having contact means engageable with the periphery of the cutter head; a blade-positioning gauge; support means for said gauge; means pivotally mounting said support means on said base for pivotal movement about an axis generally parallel to said contact means; and means adjustably mounting said gauge on said support means for movement generally toward and away from the cutter head.

5. In a device for setting a blade in a blade slot in a circular cutter head, the combination of: a base having contact means engageable with the periphery of the cutter head; a blade-positioning gauge; support means for said gauge; means pivotally mounting said support means on said base for pivotal movement about an axis generally parallel to said contact means; means mounting said gauge on said support means; and adjustable means carried by said base and engageable with an end of the cutter head.

6. In a device for setting a blade in a blade slot in a circular cutter head, the combination of: a base having contact means engageable with the periphery of the cutter head; a blade-positioning gauge; support means for said gauge; means pivotally mounting said support means on said base for pivotal movement about an axis generally parallel to said contact means; means adjustably mounting said gauge on said support means for movement generally toward and away from the cutter head; and adjustable means carried by said base and engageable with an end of the cutter head.

7. In a device for setting a blade in a blade slot in a circular cutter head, the combination of: a base having two spaced, parallel contact means engageable with the periphery of the cutter head on opposite sides of the blade slot therein; a blade-positioning gauge; support means for said gauge; means pivotally mounting said support means on said base for pivotal movement about an axis lying generally between said contact means, said gauge being located generally between said contact means for blade-positioning engagement by a blade disposed in the blade slot and projecting outwardly therefrom between said contact means; and means mounting said gauge on said support means.

8. In a device for setting a blade in a blade slot in a circular cutter head, the combination of: a base having two spaced, parallel contact means engageable with the periphery of the cutter head on opposite sides of the blade slot therein; a blade-positioning gauge; support means for said gauge; means pivotally mounting said support means on said base for pivotal movement about an axis lying generally between said contact means, said gauge being located generally between said contact means for blade-positioning engagement by a blade disposed in the blade slot and projecting outwardly therefrom between said contact means; and means adjustably mounting said gauge on said support means for movement generally toward and away from said contact means.

9. In a device for setting a blade in a blade slot in a circular cutter head, the combination of: a base having two spaced, parallel contact means engageable with the periphery of the cutter head on opposite sides of the blade slot therein; a blade-positioning gauge; support means for said gauge; means pivotally mounting said support means on said base for pivotal movement about an axis lying generally between said contact means, said gauge being located generally between said contact means for blade-positioning engagement by a blade disposed in the blade slot and projecting outwardly therefrom between said contact means; means adjustably mounting said gauge on said support means for movement generally toward and away from said contact means; and adjustable means carried by said base and engageable with an end of the cutter head.

10. A device as defined in claim 7 wherein said contact means have cylindrical contact surfaces engageable with and making line contact with the periphery of the cutter head.

11. A device as defined in claim 10 wherein said contact means are cylindrical rods.

12. A device as defined in claim 7 wherein the distance between said contact means is small as compared to the circumference of the cutter head, whereby to provide free access to gib screws external to the device and engageable with gibs for clamping the blade in the blade slot.

13. In a device of the character described, the combination of: a base including two end members interconnected by two spaced, parallel contact members; two support members pivotally connected to said end members, respectively, for pivotal movement about an axis generally between and parallel to said contact members; and a gauge mounted on said support members and disposed between said end members and between said contact members.

14. A device as defined in claim 13 including means adjustably mounting said gauge on said support members for movement generally toward and away from a plane extending between said contact members.

15. A device according to claim 14 including at least one adjusting screw extending through one of said end members and parallel to said contact members.

16. A device according to claim 1 wherein said gauge is a ruled plate.

References Cited in the file of this patent

UNITED STATES PATENTS

| 1,203,814 | Tomkinson | Nov. 7, 1916 |
| 1,416,810 | Foster | May 23, 1922 |
| 2,224,728 | Gulliksen | Dec. 10, 1940 |
| 2,589,865 | Rivard | Mar. 18, 1952 |

FOREIGN PATENTS

| 260,884 | Great Britain | Nov. 11, 1926 |